UNITED STATES PATENT OFFICE.

ALLARD MEMMINGER, OF CHARLESTON, SOUTH CAROLINA, ASSIGNOR OF ONE-HALF TO AUGUSTINE I. SMYTHE AND MOSES E. LOPEZ, BOTH OF SAME PLACE.

PROCESS OF MAKING ACID PHOSPHATES.

SPECIFICATION forming part of Letters Patent No. 445,567, dated February 3, 1891.

Application filed May 15, 1890. Serial No. 351,962. (No specimens.)

*To all whom it may concern:*

Be it known that I, ALLARD MEMMINGER, of Charleston, Charleston county, South Carolina, have invented a new and useful Improvement in the Art of Manufacturing Acid Phosphates, of which the following is a specification.

My invention relates to the manufacture of acid phosphates from phosphate rock, the said phosphate being, as is well known, used as artificial manure.

My invention consists more particularly in the addition of a fluoride compound to the ground or comminuted phosphatic material mixed with acid, whereby among other advantages hereinafter detailed the time of drying of the resulting product is greatly diminished.

The manufacture of acid or superphospates is, as is well known, based upon the treatment of the pulverized or ground rock with sulphuric acid. In order to insure a thorough reaction, it is customary to grind the rock very finely, and usually so that the powder will pass through a sieve having eighty meshes to the inch. The powder is then stirred with a large percentage of sulphuric acid, ordinarily of a density of about 50° Baumé, after which the mixture is dried by exposure to the air. South Carolina phosphate from "land" rock requires under these conditions from five to six days to become sufficiently dry to allow of its being packed and shipped. The period of drying, however, will depend greatly, first, upon the fineness of pulverization; second, upon the strength of the acid employed, and, third, upon the constituent character of the rock. Thus South Carolina land phosphate comminuted to pass through a forty-mesh sieve will take about two weeks to dry. Lowering the density of the acid also retards the drying operation. Finally, there are varieties of phosphate rock especially prevalent in Florida, which, with the necessarily large combining proportion of acid used, produce a pasty mass, which it is nearly impossible to dry, and which is therefore incapable of being handled and unmarketable. On the other hand, it is well known that there are kinds of phosphate rock—such as South Carolina "river" rock—which dries much more readily than other varieties, and hence it is not uncommon to mix a proportion of quick-drying rock or even of common marl with the slow-drying phosphate material, and in this way to accelerate to some extent the desiccation of the whole.

I have discovered and by repeated practical experiments I have proved the truth of the discovery that by the simple addition of a fluoride to the mixture of phosphate rock and acid the drying operation can be greatly hastened. I have also determined that the addition of the fluoride renders such fine grinding of the rock as is common unnecessary, and that excellent results are obtainable when the comminution is not beyond that of the condition of a powder which will pass through a forty-mesh sieve. I have also found as a further advantage that sulphuric acid of at least five degrees lower density may be employed successfully.

In order to exhibit one operative mode of carrying my said process into effect in order to produce a beneficial result, I proceed as follows, the phosphate rock employed being South Carolina land rock: To a given amount of said rock I add five per cent. of calcium fluoride, (fluor-spar,) grinding the two materials together to pass through a forty-mesh sieve. I then mix the combined substances with about forty-five per cent. of sulphuric acid at, say, 50° Baumé, and after stirring turn out the mass, which will be found to dry in about forty-eight hours. If, however, the rock be pulverized to pass through an eighty-mesh sieve, the drying will occur in about half of the above period. It will be apparent, therefore, that the proportion of fluoride to be added will depend largely upon the degree of comminution of the rock. The more fine the pulverization the less the proportion of fluoride, and the coarser the pulverization the more fluoride required.

Of course it is to be understood that such a proportion of fluoride must not be added as to produce too rapid drying, as this might interfere with the proper action of the acid.

It will thus be apparent that not only am I enabled to insure quick drying of the fertilizer, but I can regulate the period of drying so as to suit any given character of rock under treatment by simply varying the proportion of fluoride employed or by keeping the proportion of fluoride constant and varying the degree of pulverization of the rock.

In dealing with a normally quick-drying rock I use a less proportion of fluoride. If, on the contrary, I treat such phosphate rock as that which abounds in Florida, and which, as I have stated, requires so much acid that the mixture practically refuses to dry, I simply use a greater proportion of fluoride.

I do not limit myself to the use of calcium fluoride, because other fluoride compounds—such as sodium or potassium fluorides—might be employed; but I greatly prefer calcium fluoride on account of its abundance and cheapness. So, also, the treatment of the phosphate rock by sulphuric acid in contradistinction to other acids—such as nitric or hydrochloric—is not essential to my process.

Among other advantages secured by my process are that the acid in the manufactured fertilizer is produced in a practically anhydrous condition. It does not, therefore, attack the bags in which the manure is packed, as is the case when the acid, by reason of an excess of water, is produced in the hydrated form. The losses so due to this destruction of bags by superphosphates produced in the ordinary way are large, and, so far as I am aware, up to this time no efficient means has been devised for preventing them. The possibility of quick and of graduated periods of drying opens to commerce an immense area of phosphate deposits, especially throughout Florida, which, for the reasons already given, have hitherto been regarded as unworkable. Finally, the quick drying results in the production of the phosphate in a friable and easily-disintegrated condition, and hence in a state more suitable for fertilizing purposes, and allows of more rapid shipment of the material than has hitherto been possible.

I claim—

1. The improvement in the art of manufacturing superphosphate from a phosphatic material, which consists in combining said material with an acid and a fluoride compound.

2. The improvement in the art of accelerating the drying of a compound of phosphatic material and acid by adding thereto a substance containing fluorine.

3. The improvement in the art of manufacturing superphosphate from a phosphatic material, which consists in combining said material with sulphuric acid and calcium fluoride.

4. The improvement in the art of graduating the drying period of a compound of phosphatic material and an acid, which consists in comminuting said material to a definite degree and adding thereto a greater or less proportion of a fluoride compound.

5. The improvement in the art of graduating the drying period of a compound of phosphatic material, an acid, and a definite proportion of a fluoride compound, which consists in varying the degree of comminution of said phosphatic material.

ALLARD MEMMINGER.

Witnesses:
PARK BENJAMIN,
M. BOSCH.